United States Patent
Fowler

[11] 3,821,904
[45] July 2, 1974

[54] HANDLE MECHANISM
[76] Inventor: Arthur G. Fowler, 15628 Cordury Ave., Lawndale, Calif. 90260
[22] Filed: June 5, 1972
[21] Appl. No.: 259,847

[52] U.S. Cl. .................. 74/142, 74/816, 408/135
[51] Int. Cl. ............................................. F16h 27/02
[58] Field of Search .......... 74/816, 817, 142; 90/14; 408/135, 136

[56] References Cited
UNITED STATES PATENTS

| | | | |
|---|---|---|---|
| 1,032,408 | 7/1912 | Mimorr | 408/135 |
| 1,461,316 | 7/1923 | La Casse | 74/816 |
| 2,871,721 | 2/1959 | Abramoska et al. | 74/816 |
| 2,882,761 | 4/1959 | Knosp et al. | 408/136 |

*Primary Examiner*—Samuel Scott
*Assistant Examiner*—Wesley S. Ratliff, Jr.
*Attorney, Agent, or Firm*—John Holtrichter, Jr.

[57] ABSTRACT

A handle mechanism for machine tools having a manually rotatable shaft, the mechanism including an indexing fixture with an indexing plate and a sleeve fixedly mountable on the rotatable shaft, and includes a frame member with a handle-mounted yoke portion and a pivotally mounted block portion with an opening to rotatably mount but be axially restrained on the sleeve, the block portion carrying a sliding indexing pin registerable into indentations in the indexing plate and movable in and out of registration with the indexing plate by relative pivotal movement between the block and yoke portions by manual manipulation of the handle in a plane generally parallel to the axis of rotation of the rotatable shaft, whereby the indexing pin may be made to engage the indexing fixture and turn the rotatable shaft only when the handle is in a pre-determined axial position.

8 Claims, 6 Drawing Figures

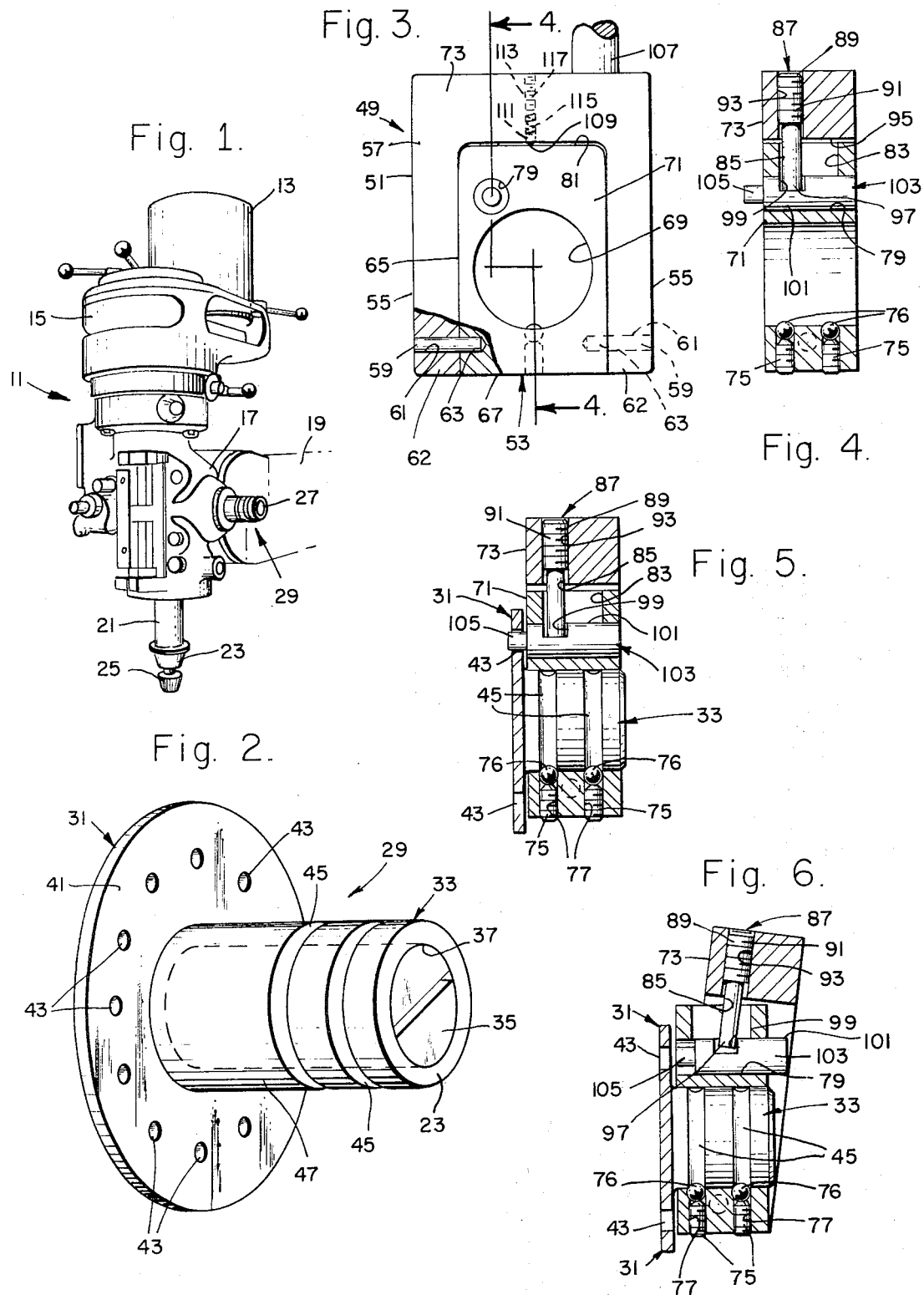

HANDLE MECHANISM

BACKGROUND OF THE INVENTION

The background of the invention will be set forth in two parts.

1. Field of the Invention

The present invention pertains generally to the field of machine tools and more particularly to a handle mechanism which can engage and disengage from a rotatable machine tool shaft.

2. Description of the Prior Art

Handle mechanisms which rotate shafts to move a tool toward and away from a workpiece are well known. These devices generally comprise a hub fixedly attached to the rotatable shaft and radially disposed handle members, any one of which may be grasped by a machine operator to rotate the shaft and move the working tool. Although still in wide use, this technique has certain obvious disadvantages. For example, the operator must usually release his hold on one handle and grasp the next handle to advance the working portion of the tool. This usually requires that the operator move his eyes from the workpiece in order to view the handle mechanism, or that he grope about trying to find the next handle to grasp. In either case, time and possibly accuracy, is lost.

In order to overcome this problem, there has been developed in the art, a device wherein a single handle-mounted hub member is slidably mounted on a spool member fixed on the end of the machine's rotatable shaft. By reaching over and pulling axially outwardly on the hub member, the hub and handle may be disengaged from the spool member so that the handle may be rotated back to a convenient position before the hub member is pushed back to again engage the spool member and the rotatable shaft. The disadvantage of this technique lies in the requirement that the hub be pulled axially outwardly and then pushed back to perform its function.

It should be evident that an improved scheme which neither requires the grasping of different handles nor the pushing of a hub member toward and away from a machine tool in order to move a working portion of the machine, would constitute a significant advancement of the art.

SUMMARY OF THE INVENTION

In view of the foregoing factors and conditions characteristic of the prior art, it is a primary object of the present invention to provide a novel and improved handle mechanism for machine tools having a manually rotatable shaft.

It is another object of the present invention to provide a simple yet rugged and reliable handle mechanism.

It is still another object of the present invention to provide a handle mechanism which utilizes only a single handle and does not require a machine tool operator to remove his hand from the handle in order to advance the rotation of the tool's rotatable shaft.

According to the present invention, a handle mechanism is provided for machine tools having a manually rotatable shaft, the mechanism including an indexing fixture having an indexing plate and a sleeve portion fixedly mountable on a manually rotatable shaft, and a frame member including a yoke portion and a block portion restrictively pivotally mounted in the yoke portion and rotatably mounted in a fixed axial position on the sleeve portion of the indexing fixture. Indexing means is operatively coupled to the yoke portion and to the block portion and includes an indexing pin registerable with the indexing fixture for locking the frame means to the indexing fixture when the yoke portion is in a pre-determined pivotal relationship to the block portion. The invention also includes handle means mounted on the yoke portion for pivoting the yoke portion with respect to the block portion to engage and disengage the indexing pin from the indexing fixture and for rotating the indexing fixture only when the yoke portion is in the pre-determined relationship. The yoke portion may include a pair of spaced arm portions extending from a body portion and the block portion may be pivoted along a pivotal axis lying adjacent a first end thereof and adjacent the end extremities of the arm portions, and wherein the indexing pin may be actually movable along a line orthogonal to the pivotal axis.

The features of the present invention which are believed to be novel are set forth with particularity in the appended claims. The present invention, both as to its organization and manner of operation, together with further objects and advantages thereof, may best be understood by making reference to the following description taken in conjunction with the accompanying drawing in which like reference characters refer to like components in the several views.

BRIEF DESCRIPTION OF THE DRAWING

FIG. 1 is a perspective view of a portion of a machine tool having a manually rotatable shaft fitted with an indexing fixture in accordance with the present invention;

FIG. 2 is an enlarged perspective view of the indexing fixture shown in FIG. 1, but not drawn to proportion;

FIG. 3 is a view, partially broken away, of a broad surface of a frame member fabricated in accordance with the present invention;

FIG. 4 is a sectional view of the frame member of FIG. 3, taken along lines 4—4;

FIG. 5 is a sectional view showing the frame member of FIG. 4 with its indexing pin engaging the indexing fixture; and FIG. 6 is the handle mechanism shown in FIG. 5, wherein the indexing pin has been retracted by pivoting the yoke portion of the frame member so that the latter is free to rotate independently of the indexing fixture.

DESCRIPTION OF THE INVENTION

Referring now to the drawing, and more particularly to FIGS. 1 and 2, there is shown a portion of a conventional machine tool 11, such as a milling machine or a vertical lathe, including an electric motor 13, a speed changing arrangement 15, and a head portion 17 supported at the end of a base-mounted arm 19. The head portion 17 carries an elongated and axially movable quill member 21, to the bottom 23 of which is attached a desired milling cutter 25, for example. The quill member 21 is moved axially by an internal gearing arrangement (not shown) coupled to a rotatable shaft 27 which extends from the side of the head portion 17.

In accordance with a presently preferred embodiment of the invention, the handle mechanism includes an indexing fixture 29 having an annular indexing plate or flange 31 and a transversely attached elongated circular sleeve 33 slidably disposed about the rotatable shaft 27. The fixture 29 is fixed on the shaft by suitable means such as a threaded flat head screw 35 engaging a threaded hole (not shown) in the end of the shaft 27 after passing through a beveled opening 37 in the end 39 of the sleeve 33. The plate 31 includes a flat surface 41 with indexing indentations or holes 43 symmetrically spaced in a circle coaxial with the axis of the sleeve and, of course, with the rotational axis of the rotatable shaft 27.

The fixture 29 may be fabricated from any suitable material such as steel, for example, by machining from a single block of material, or preferably the plate and the sleeve may be individually made and secured together by welding or any other suitable process. The inner surface of the sleeve 33 is dimensioned to slidably fit over the outer surface of the shaft 27, and one or two continuous grooves 45 are machined in an outer surface 47 of the sleeve, as best seen in FIG. 2. With the screw 35 tightened in place, the indexing fixture 29 is fixedly attached to, and if turned, will rotate the machine tool's shaft 27.

The present handle mechanism also includes a frame member 49 including a yoke portion 51, and a block portion 53 which is pivotally mounted between the yoke's spaced arms 55, extending from a body portion 57, by means of pivot pins 59 fixedly mounted in elongated openings 61 in the arms 55 adjacent their ends 62. The pins extend into appropriate bearing openings 63 on opposite sides 65 of the block portion 53 adjacent its outer end 67, as best viewed in FIG. 3.

The block portion 53 is provided with an opening 69 in its flat broad surface 71 that is registerable with (lies in the same plane) a flat surface 73 of the yoke portion 51 when these two portions are in a pre-determined pivotal alignment or relationship, as illustrated, for example, in FIGS. 4 and 5. The opening 69 preferably extends completely through the block portion 53 and is dimensioned to have a diameter slightly greater than that of the sleeve's outer surface 47 whereby the frame member 49 may rotate freely about the sleeve 33 but is restricted in axial movement with its flat surfaces 71 and 73 immediately adjacent the flat surface 41 of the indexing fixture's plate 31 by the action of threaded guide pins 75 partially projectable into the grooves 45 from threaded holes 77 in the outer end 67 of the block portion 53.

As part of an indexing means, the block portion 53 also includes an elongated passage 79 adjacent an inner end 81 and extending inwardly from the surface 71 parallel to the axis of the opening 69. The passage 79 may extend through the block portion 53 and communicates with an elongated slot 83 extending inwardly from the block's inner end 81. The axis of the slot 83 lies essentially in a plane intersecting and parallel to the longitudinal axis of the passage 79 so that a shank portion 85 of a locating pin 87 having a head 89 and a threaded shank portion 91 will allow pivoting of the block portion limited only by the length of the slot 83 when the pin 87 extends inwardly from a threaded aperture 93 in an inner surface 95 of the yoke's body portion 57. Preferably, the slot-pin positioning is such that the pivotal relationship between the block and yoke portions restricts pivoting in one direction to the aforementioned predetermined relationship of FIGS. 4 and 5, and in the other direction to where the plane of the yoke's surface 73 passes through the block portion 53 behind the block's flat surface 71, as seen in FIG. 6.

The length of the locating pin's shank portion 85 is preferably such that its tip 97 extends up to approximately the axis of the passage 79 and relatively loosely registers in a notch 99 in an outer cylindrical surface 101 of an elongated indexing pin 103 slidably disposed in the passage 79. The pin 103, in this embodiment, includes a reduced diameter end 105 located adjacent the block's flat surface 71, which end 105 extends beyond the surface 71 when the frame member pivotal relationship is as seen in FIG. 4, by the action of the locating pin 87 keeping the indexing pin in a relatively fixed spatial relationship to the yoke portion 51. However, the pivoting of one of the frame portions with respect to the other will cause the locating pin 87, which extends into the notch 99 to pull the indexing pin in a direction away from the block's broad surface 71 so that its end 105 no longer projects beyond this flat surface.

The radial distance of the axis of the passage 79 from the axis of the opening 69 is made equal to the radial distance of the axis of the indexing holes 43 from the axis of rotation of the shaft 27 so that the indexing pin end 105 will register with any of the holes 43 in the indexing fixture plate 31. Thus, when the frame member portions are in the pre-determined relationship, the indexing pin 103 will be able to register with a desired hole 43 in the indexing fixture 29 to at least temporarily lock these two major elements of the handle mechanism together, as illustrated, for example, in FIG. 5.

The frame member 29 is further provided with a single elongated handle 107, a portion of which is shown in FIG. 3. The handle 107 is threadably attached or otherwise affixed to the yoke portion 51 whereby a machine operator may pivot the yoke portion with respect to the block portion from the "locked" position of FIG. 5 to the "unlocked" position of FIG. 6, before moving the handle 107 to rotate only the frame member 49 with respect to the now stationary indexing fixture 29 and the machine's shaft 27. When the handle 107 is in a desired position, the operator merely moves the handle in a small arc to regain the frame member's "predetermined" pivotal relationship and thereby locks the handle to the fixture 29 so that normal movement of the handle will cause the machine tool's shaft 27 to rotate and move the cutter 25 in a desired direction.

In the preferred embodiment of the invention, a detent arrangement is provided in the frame member tending to bias the two portions thereof in the aforesaid "pre-determined" relationship. This arrangement may include a detent depression 109 in the inner end 81 of the block portion 53 and a sphere 111, located in a threaded hole 113 in the yoke's body portion 57, and biased toward the end 81 and registerable with the depression 109 by a coil spring 115 adjustably retained by a threaded set screw 117. Of course, the relative positions of the depression 109 and the hole 113 are such that they are in alignment only when the flat surfaces 71 and 73 essentially occupy the same plane.

It should be understood that the materials used in fabricating the various parts and elements of the invention are not critical, and any material generally considered to be suitable for a particular purpose or function may be utilized. For example, the yoke and block portions of the frame member may be fabricated from iron or steel or an aluminum alloy, or even certain strong synthetic materials. Preferably, the indexing plate, and index and locating pins are of a relatively hard or hardened material for favorable longetivity.

From the foregoing, it should be evident that the handle mechanism constructed in accordance with the present invention provides a new and improved device which significantly advances the machine tool art. However, it should also be realized that the invention is susceptible to modifications and embodiments not illustrated in detail here, but which fall within the scope of the teachings herein provided. Accordingly, it is intended that the foregoing disclosure and drawing shall be considered only as illustrations of the principles of this invention.

What is claimed is:

1. A handle mechanism for machine tools having a manually rotatable shaft, comprising:
   an indexing fixture having an indexing plate and a sleeve portion fixedly mountable on a manually rotatable shaft;
   a frame member including a yoke portion with a pair of spaced arm portions extending from a body portion, and including a block portion restrictively pivotally mounted in said yoke portion and rotatably mounted in a fixed axial position on said sleeve portion of said indexing fixture, said block portion being pivoted along a pivotal axis lying adjacent a first end thereof and adjacent the end extremities of said arm portions;
   indexing means operatively coupled to said yoke portion and to said block portion and including an indexing pin registerable with said indexing fixture for locking said frame member to said indexing fixture when said yoke portion is in a predetermined pivotal relationship to said block portion, said indexing pin being axially movable along the line orthogonal to said pivotal axis; and
   handle means mounted on said yoke portion for pivoting said yoke portion with respect to said block portion to engage and disengage said indexing pin from said indexing fixture and for rotating said indexing fixture only when said yoke portion is in said predetermined relationship.

2. The mechanism according to claim 1, wherein said sleeve portion is circular in cross-section, and wherein said block portion includes a circular opening therein extending into said block portion along an axis orthogonal to said pivotal axis dimensioned to slidably accept said sleeve portion.

3. The mechanism according to claim 2, wherein said sleeve portion includes a circular groove in its outer surface, and wherein said block portion includes a guide pin extendable into said groove.

4. The mechanism according to claim 3, wherein said block portion includes a cylindrical cavity and said indexing pin is slidably disposed in said cavity and includes an elongated rod portion with a notch in its outer cylindrical surface, wherein said indexing means includes a locating pin extending from said yoke portion through an elongated slot in said block portion and registering in said notch whereby said indexing pin is moved axially with relative movement between said block and yoke portions and is extendable beyond said block portion towards said indexing fixture.

5. The mechanism according to claim 4, wherein said indexing fixture includes an indexing flange portion essentially perpendicular to the axis of rotation of said sleeve portion, said indexing flange portion having a flat annular surface facing said sleeve portion and symmetrically positioned indexing indentations lying in a circle coaxial with said axis of rotation and each dimensioned to accept said indexing pin.

6. The mechanism according to claim 5, wherein said block portion includes a broad face surface through which said opening and said cavity extend, said broad face surface being slidably positionable adjacent said flat annular surface.

7. The mechanism according to claim 6, wherein said yoke portion includes a flat surface lying in essentially a common plane with a broad face surface of said block portion when said portions are in said pre-determined relationship.

8. A handle mechanism for machine tools having a manually rotatable shaft, comprising:
   indexing fixture means mountable on a manually rotatable shaft of a machine tool for rotating the shaft, said indexing fixture means including a circular sleeve portion having at least one circular groove in an outer surface thereof and also including a transversely disposed indexing flange portion having a flat annular surface facing said sleeve portion, said annular surface including symmetrically positioned indexing indentations lying in a circle coaxial with the longitudinal axis of said sleeve portion;
   a yoke member having two spaced arms extending from a body portion;
   a block member having a planar surface and a circular opening in said planar surface extending into said block member along an axis perpendicular to said planar surface and dimensioned to slidably accept said circular sleeve portion, said block member being pivotally mounted between said arms of said yoke member and including guide pin means extendable into said circular groove in said circular sleeve portion for restricting axial movement of said block member with respect to said circular sleeve portion while allowing unrestricted relative rotational movement, said block member also including an elongated pin chamber communicating with said planar surface adjacent an inner end thereof and having a longitudinal axis essentially parallel to said axis of said opening, said block member further including an elongated slot in an end surface which communicates with and is parallel to said pin chamber;
   an elongated indexing pin member slidably disposed in said pin chamber, said pin member having a notch in a side surface thereof;
   a locating pin extending from said yoke member and into said elongated slot in said block member and registering in said notch in said indexing pin member; and
   handle means attached to said yoke member for pivoting said yoke member with respect to said block member from a position in which said indexing pin member extends beyond said planar surface of said block member into said indexing indentations of said rotatable shaft mounted indexing flange portion to a position in which said indexing pin member is pulled by said locating pin back within said block member to a non-protruding location to rotatively free said yoke member from said indexing fixture means.

* * * * *